(12) United States Patent
Pierce

(10) Patent No.: US 8,739,917 B2
(45) Date of Patent: Jun. 3, 2014

(54) OFF-ROAD VEHICLES

(76) Inventor: Sioin Emyr Pierce, Denbigh (GB)

(*) Notice: Subject to any disclaimer, the term of this patent is extended or adjusted under 35 U.S.C. 154(b) by 160 days.

(21) Appl. No.: 13/297,897

(22) Filed: Nov. 16, 2011

(65) Prior Publication Data

US 2012/0138377 A1 Jun. 7, 2012

(30) Foreign Application Priority Data

Nov. 17, 2010 (GB) .................................. 1019415.7

(51) Int. Cl.
*B62D 61/10* (2006.01)
(52) U.S. Cl.
USPC ............................ 180/299; 180/22; 180/65.6
(58) Field of Classification Search
USPC .......... 180/22, 24.01, 24.07, 24.13, 299, 65.6
See application file for complete search history.

(56) References Cited

U.S. PATENT DOCUMENTS

| | | | | | |
|---|---|---|---|---|---|
| 3,809,004 | A | * | 5/1974 | Leonheart | 180/21 |
| 4,420,167 | A | * | 12/1983 | Winblad | 280/5.501 |
| 4,513,832 | A | * | 4/1985 | Engman | 180/6.5 |
| 4,562,893 | A | * | 1/1986 | Cunard | 180/6.5 |
| 4,664,208 | A | * | 5/1987 | Horiuchi et al. | 180/23 |
| 4,757,871 | A | * | 7/1988 | Steimer | 180/273 |
| 4,817,747 | A | * | 4/1989 | Kopczynski | 180/22 |
| 4,821,825 | A | * | 4/1989 | Somerton-Rayner | 180/22 |
| 6,196,343 | B1 | * | 3/2001 | Strautnieks | 180/22 |
| 6,601,665 | B2 | * | 8/2003 | Hurlburt | 180/24.11 |
| 6,722,455 | B2 | * | 4/2004 | Hurlburt | 180/24.12 |
| 7,004,270 | B2 | * | 2/2006 | Hori et al. | 180/9.52 |
| 7,108,086 | B2 | * | 9/2006 | Hurlburt | 180/22 |
| 7,669,675 | B2 | * | 3/2010 | Hagie | 180/24 |
| 7,726,423 | B2 | * | 6/2010 | Atley | 180/24.01 |
| 7,828,310 | B2 | * | 11/2010 | Vreeswijk et al. | 280/250.1 |
| 7,845,443 | B2 | * | 12/2010 | Liberty et al. | 180/24.07 |
| 8,376,077 | B2 | * | 2/2013 | Venton-Walters | 180/209 |
| 8,464,816 | B2 | * | 6/2013 | Carrier | 180/24.07 |
| 2007/0080001 | A1 | * | 4/2007 | Beck et al. | 180/24.07 |

* cited by examiner

*Primary Examiner* — Jeffrey J Restifo
(74) *Attorney, Agent, or Firm* — Bricker & Eckler LLP

(57) ABSTRACT

An off-road vehicle comprising a pair of articulatable chassis members each swivelably connected at or near one end thereof by a generally upright trailing yoke therebetween, each chassis member including means for mounting respective forward, middle and rearward wheel means thereon, the center of the yoke including means for swivelably receiving the trailing end of a rockable cradle for supporting a driver of the vehicle, the cradle being rockable about an axis generally transverse to the wheel axes, the leading end of the cradle forming a leading yoke connected to respectively opposite ends of a pair of pivotable struts, the other end of each strut being pivotally connected to a respective leading part of one of the pair of chassis members, the arrangement being such that independent vertical movement of the or each wheel means is generally isolated from the cradle and hence the driver of the vehicle.

18 Claims, 6 Drawing Sheets

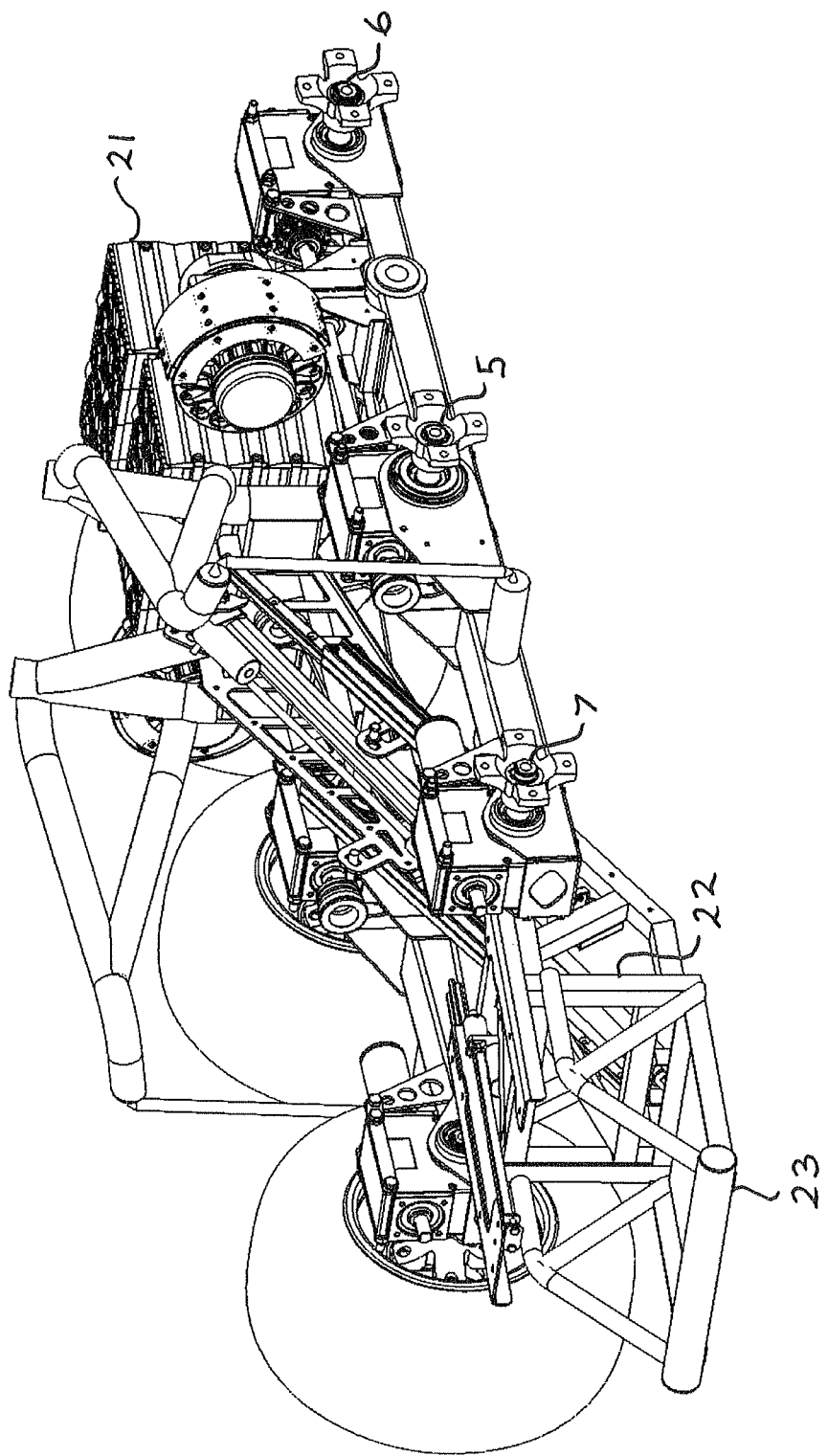

OFF-ROAD VEHICLES

CROSS-REFERENCE TO RELATED APPLICATIONS

This application claims the benefit of priority to British Patent Application No. GB1019415.7, filed Nov. 17, 2010.

FIELD

This invention relates to off-road vehicles such as those used for traveling over rough terrain, which may include heathland, moorland, and rock-strewn ground.

BACKGROUND

It is well known that off-road vehicles require adaptations from on-road vehicles in order to cope with the unevenness of the ground, ranging from the use of tracked vehicles, such as military tanks, to four-wheel drive vehicles with adaptive suspension with which to smooth out the ride over rough terrain. Whichever solution is adopted it is generally the case that the size and shape of the vehicle will dictate its ability to safely traverse rough ground, particularly when the vehicle is moving forward across a slope, since this significantly increases the risk of overturning. This risk is apparent from the number of accidents involving four wheel quad bikes, and is exacerbated by the height of these vehicles, as compared to their relatively short axle width and short wheel base. As a consequence of these considerations it is generally appreciated that access to off-road ground is impractical for many people, including the aged or disabled, unless a relatively large off-road vehicle is used.

SUMMARY OF THE INVENTION

The present invention is derived from the realisation that there is a need for an off-road vehicle equivalent to an on-road mobility scooter but which is adapted to provide stability when traversing over e.g. rocks on inclined ground such as the side of a hill but which still provides a high degree of stability and safety for even a disabled or infirm driver.

According to a first aspect of the invention there is provided an off-road vehicle comprising or including a pair of articulatable chassis members each swivelably connected to a generally upright yoke therebetween, each chassis member including means for mounting respective forward, middle and rearward wheel means thereon driven at least partially by drive means, the center of the yoke including means for swivelably receiving the trailing end of a rockable cradle for supporting a driver of the vehicle, the cradle being rockable about an elevated axis generally transverse to the wheel axes, the leading end of the cradle forming a leading yoke connected to respectively opposite ends of a pair of pivotable struts, the other end of each strut being pivotally connected to a respective leading part of one of the pair of chassis members, the arrangement being such that independent vertical movement of the or each wheel means is generally isolated from the cradle and hence the driver of the vehicle.

With this arrangement the articulation of the chassis members as the vehicle moves over rough ground is partially isolated from the driver by the cradle, which acts in a manner similar to a gimbal and retains the center of gravity of the vehicle generally over the center of the vehicle. Because of the articulatable characteristics of the pair of chassis members and wheel means attached to them, the vehicle remains stable even over rough and inclined ground, with the driver generally retaining an upright position on or in the cradle.

Conveniently, each chassis member comprises a pair of leading and trailing chassis beams swivelably connected together end-on-end by means of a central axle for mounting the middle wheel means thereon, which wheel means may conveniently be conventional road going vehicle wheels and associated elastomeric tires, each wheel being mounted on a respective stub axle, with the forward and rearward wheels being mounted at the respective free ends of the swivelably connected chassis beams, the vehicle therefore conveniently comprising or including six wheels and associated tires.

In one embodiment the yoke is pivotably connected to the trailing chassis beams about a third of the distance along the beams from the rearward axles relative to the middle axles, and the pair of pivotable struts are connected to respective leading chassis beams approximately equidistant between the middle axles and the forward axles, although it will be understood that the positioning of the yoke and struts relative to the chassis beams can be varied as required.

In another embodiment the yoke is pivotably connected to the trailing end of the rockable cradle at a point generally midway between the chassis beams above the middle wheel means and may conveniently be adjustable as to position to ensure that the vehicle and driver are properly balanced. By positioning the pivotable connection centrally within the vehicle above the middle drive means, this also provides room for electric drive motors and associated batteries to be positioned behind the driver, and in a preferred embodiment two electric motors are used, one each for driving the wheel means on a respective side of the vehicle, such as via a wormwheel drive train.

The invention will now be described, by way of example only, with reference to the accompanying drawings in which:

BRIEF DESCRIPTION OF THE DRAWINGS

FIG. 6 is a part cut away perspective view of the vehicle of FIG. 5 showing the mechanism by which the vehicle seat can be moved to a ground engaging position.

DETAILED DESCRIPTION OF THE DRAWINGS

Figure 1:
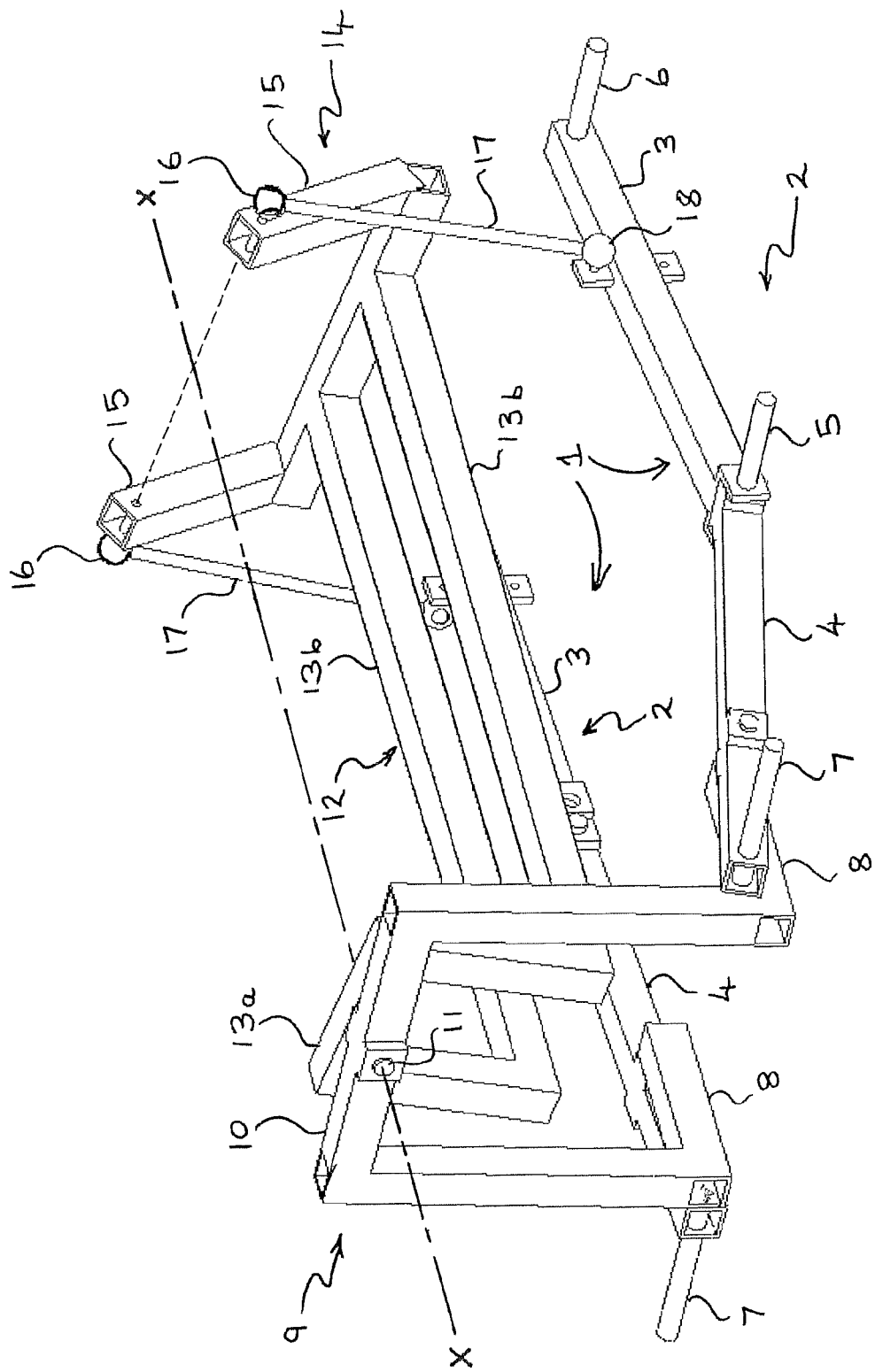
FIG. 1 is a perspective view from the rear and one side of a vehicle chassis and associated cradle for use in accordance with a vehicle of the invention.

In FIG. 1 there is shown a general arrangement of chassis means 1 comprising a pair of chassis members shown generally at 2, each comprising a leading chassis beam 3 and a trailing chassis beam 4 swivelably connected to each other end-on-end by means of pivot pins for stub axles 5 which extend outwardly therefrom and onto which may be rotatably fixed wheel means in the form of a conventional vehicle wheel and tyre (not shown). Corresponding stub axles 6 and 7 extend outwardly from the respectively forward and rear chassis beams 3, 4 for receiving respectively opposite pair of wheels (not shown) forming part of a six-wheel vehicle configuration.

The trailing chassis beams 4 are swivelably connected to respectively 'L'-shaped legs 8 of a yoke shown generally at 9 which includes a raised shoulder 10 having a centrally-disposed lynch pin 11 for swivelably securing thereto a rockable cradle shown generally at 12 having a generally inverted 'U' shaped trailing end 13a, and a pair of forwardly disposed vehicle seat support beams 13b connected at their forward end to a generally 'U' shaped leading yoke shown generally at 14. The yoke 14 includes a pair of generally upright arms 15 on the free ends of each of which is an upper ball joint 16 for swivelably connecting it to a pair of pivotable struts 17 connected at their other ends to a lower ball joint 18 located on each leading chassis beam 3 approximately midway between the stub axles 5, 6.

Figure 2:
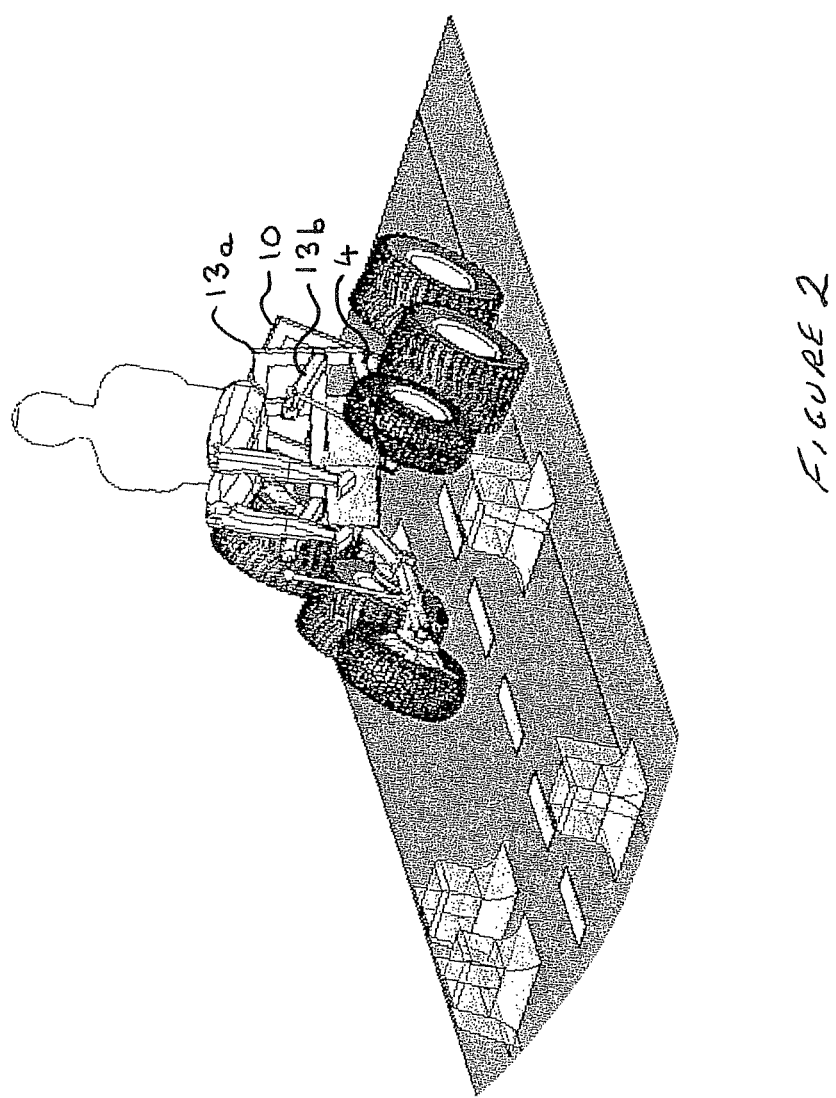
FIG. 2 is a schematic view from the front and one side of a vehicle incorporating the chassis of FIG. 1 being driven over uneven ground.

As will be apparent from FIG. 1, articulation of any part of the chassis means 1 in response to movement of the vehicle in which it forms a part will mean that it can travel over uneven ground substantially with all six wheels still being in ground contact, thereby maximising traction for the vehicle as it moves along. However, because the cradle 12 can rock about the central axis "x-x" dictated by the pivot pin 11 in the center of the shoulder 10 forming part of the yoke 9, relative movement of the rockable cradle 12 is partially isolated from movement of parts of the chassis means 1 as it travels over uneven or sloped ground. As a consequence, and as is shown in FIG. 2, a driver of the vehicle can remain in a substantially upright position with the leading and trailing yokes 14, 9 transferring the center of gravity of the driver from an upper to a lower position corresponding to that of the chassis means 1. The rockable cradle 12 therefore acts in a manner similar to a gimbal by which vertical forces due to the weight of the driver and the cab of the vehicle are effectively transferred to the central part of the chassis means 1 along an axis substantially coincident with that of the stub axles 5, or at least around that region. This arrangement not only ensures that all six wheel means are in contact with the ground but also allows the vehicle to tilt or roll sideways relative to the direction of travel without the driver also tilting by the same amount, thereby imparting considerable confidence to the driver, who might otherwise fear that the vehicle will roll over in the direction of any downward slope. This confidence can be increased by the vehicle incorporating sensors which prevent or inhibit the vehicle from continuing to travel where the sensed conditions, such as the angle of slope of the ground, are at or are heading towards predefined limits of what the vehicle is considered to be safely capable of working within.

The drive means for a vehicle according to the invention may suitably be via electric motors, which may be used to drive individual wheels or sets of wheels, such as all the wheels on one side of the vehicle through the use of a single electric motor driving chain-driven sprockets fixed for rotation with each wheel. This latter arrangement may suitably be used to selectively steer the vehicle by skid or differential steering where lateral forces are generated by introducing speed differentials as between the left and right banks of wheels. This system may be further enhanced by the use of parasitic energy circulation in which the or each electric motor on one side of the vehicle functions to drive the wheels on that side of the vehicle and the or each electric motor on the other side of the vehicle is driven to therefore return energy to the system and act as a brake.

Figure 3:
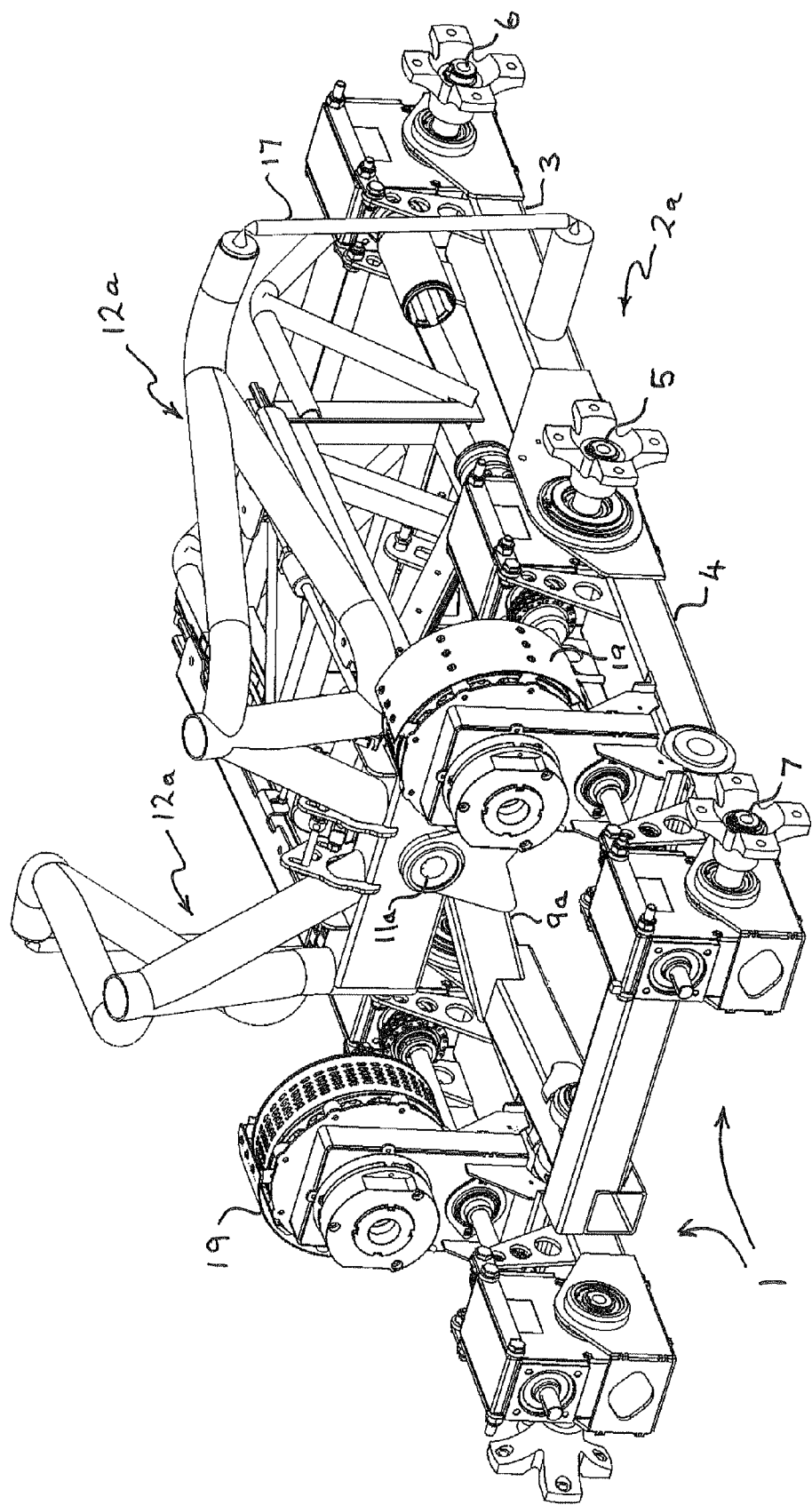
FIG. 3 is a perspective view from the rear and one side of a second embodiment of vehicle chassis and associated cradle to that shown in FIG. 1 where like parts are numbered the same.

Referring now to the second embodiment shown with reference to FIGS. 3 to 6, in FIG. 3 is shown a view of a chassis 1a and associated cradle 12a generally corresponding to that shown in FIG. 1 but in which the yoke 9a and associated lynch-pin 11a are positioned more centrally along the chassis members 2a approximately above the central stub axles 5, thereby allowing sufficient room behind the cradle 12a for a pair of electric drive motors 19 in mesh with a wormwheel gear train to each of the stub axles 5, 6 and 7. As will be seen from FIG. 4, this allows the space between the main drive motors 19 to be occupied by a housing 20 containing an array of batteries 21 for powering the motors 19 as shown in FIG. 6.

Figure 4:
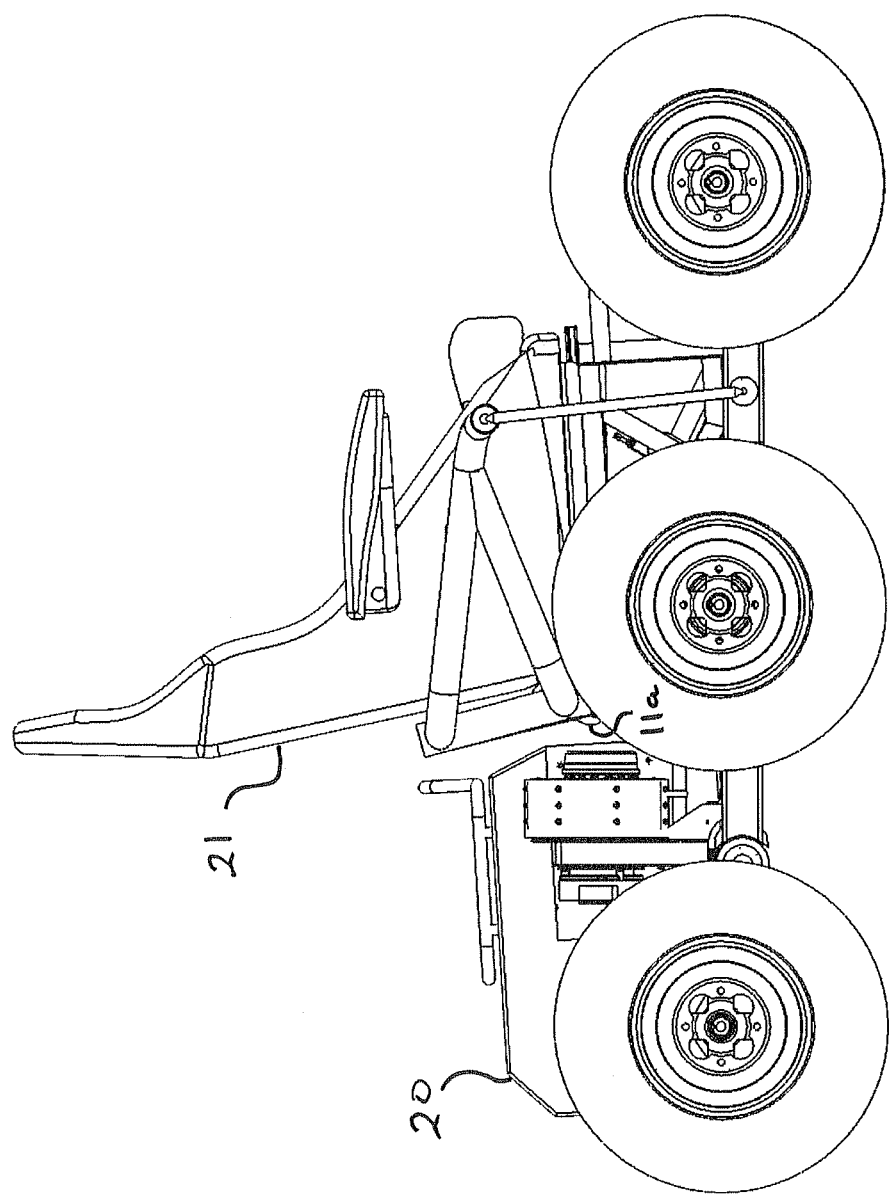
FIG. 4 is a side elevation of a complete vehicle utilising the chassis and associated cradle of FIG. 3.
Figure 5:
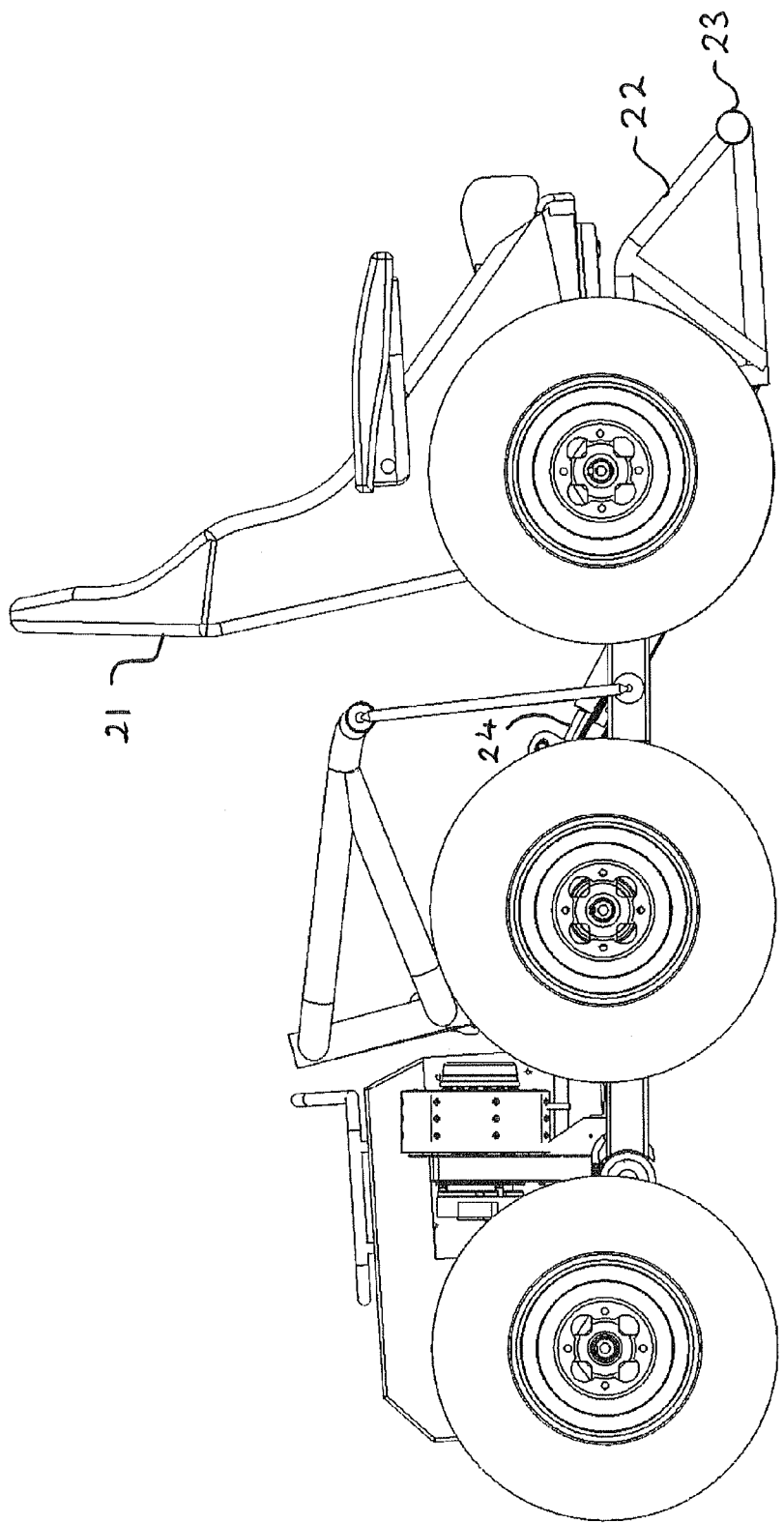
FIG. 5 is a perspective front view of the vehicle of FIG. 4.

As is shown in FIGS. 4 and 5 the foregoing arrangement is particularly suitable for placing a chair 21 within the cradle 12a, the chair being mounted for slideable movement from the position shown in FIG. 4 to the position shown in FIG. 5 on a chair support 22 having at its forward end a footrest 23 in the manner as shown more clearly with reference to FIG. 6. The chair support 22 is moveably mounted on inclined rails 24 (seen more clearly in FIG. 5) so that the chair support 22 and associated chair 21 can be moved to ground level for the purposes of transferring a driver of the vehicle from e.g. a wheelchair to the moveable chair 21 and thereafter returning the chair 21 and the driver to the position shown in FIG. 4 generally centrally within the vehicle itself. This arrangement is particularly advantageous since as well as transferring the driver of the vehicle safely and securely it also provides a sense of empowerment since once the driver has taken control of the vehicle then it can be moved independently by the driver and as a result of the weight distribution of the vehicle due to the balancing of the linkage forces at the various pivot points the vehicle can be safely driven over uneven ground, including stairways and pathways strong enough to support the weight of the vehicle and its driver.

To aid in stability the centrally disposed lynch pin 11a may suitably be adjustable as to height or forward or back to further ensure that the vehicle and driver are properly balanced.

The drive means for the wheel means may be any suitable power source, including electric motors, internal combustion engines and hydrostatic motors, and suspension components may be suitably used to dampen and smooth the ride of the vehicle.

Although the invention has been described with reference to its suitability for use as an off-road vehicle it will be apparent that the chassis configuration and increased stability afforded by the presence of a rockable cradle may make the vehicle suitable for other applications, such as mine or bomb clearance, munitions transport over rough ground, or even simply as a sports or utility vehicle for use over uneven ground where improved stability for the driver and/or any payload is required, as compared to conventional off-road vehicles having a generally rigid, substantially planar, chassis and with no independent means to avoid the disadvantage of the driver and/or payload being tilted over by substantially the same amount as the chassis itself. Similarly, although the wheel means described are conventional wheels and elastomeric tires it will be understood that they may drive tracks instead, or a combination of tracks and road-going wheels.

I claim:

1. An off-road vehicle comprising a pair of articulatable chassis members each swivelably connected to a generally upright yoke therebetween, each chassis member including means for mounting respective forward, middle and rearward wheel means thereon driven at least partially by drive means, the center of the yoke including means for swivelably receiving the trailing end of a rockable cradle for supporting a driver of the vehicle, the cradle being rockable about an elevated axis generally transverse to the wheel axes, the leading end of the cradle forming a leading yoke connected to respectively opposite ends of a pair of pivotable struts, the other end of each strut being pivotally connected to a respective leading part of one of the pair of chassis member, the arrangement being such that independent vertical movement of the or each wheel means is generally isolated from the cradle and hence the driver of the vehicle.

2. An off-road vehicle according to claim 1 wherein the chassis member comprises a pair of leading and trailing chassis beams swivelably connected together end-on-end by means of a respective central axle for mounting the middle wheel means thereon.

3. An off-road vehicle according to claim 2 wherein the wheel means are conventional road going vehicle wheels and associated elastomeric tires, each wheel being mounted on a respective stub axle, with the forward and rearward wheels being mounted at the respective free ends of the swivelably connected chassis beams, the vehicle therefore comprising or including six wheels and associated tires.

4. An off-road vehicle according to claim 3 wherein the yoke is pivotably connected to the trailing chassis beams about a third of the distance along the beams from the rearward axles relative to the middle axles.

5. An off-road vehicle according to claim 3 wherein the yoke is pivotably connected to the trailing end of the rockable cradle generally above the axis of the middle wheel means.

6. An off-road vehicle according to claim 5 wherein the position of the pivotable connection is adjustable.

7. An off-road vehicle according to claim 2 wherein the yoke is pivotably connected to the trailing chassis beams about a third of the distance along the beams from the rearward axles relative to the middle axles.

8. An off-road vehicle according to claim 2 wherein the yoke is pivotably connected to the trailing end of the rockable cradle generally above the axis of the middle wheel means.

9. An off-road vehicle according to claim 8 wherein the position of the pivotable connection is adjustable.

10. An off-road vehicle according to claim 1 wherein the pair of pivotable struts are connected to respective leading chassis beams approximately equidistant between the middle axle and the forward axles.

11. An off-road vehicle according to claim 1 wherein the pair of pivotable struts are connected to respective leading chassis beams approximately equidistant between the middle axle and the forward axles.

12. An off-road vehicle according to claim 1 wherein the drive means comprises a pair of battery driven electric motors, one for each side of the vehicle, each motor being drivingly connected to the wheel means on that side of the vehicle via a wormwheel gear train.

13. An off-road vehicle according to claim 1 wherein the drive means comprises or includes independently operable motors for each wheel means, said motors being electric, hydrostatic or internal combustion engine motors.

14. An off-road vehicle according to claim 13 wherein the wheels on each side of the vehicle are drivingly connected together by a respective pair of wormwheel drive trains.

15. An off-road vehicle according to claim 13 wherein the drive train for each set of wheels comprises or includes sprockets and chains.

16. An off-road vehicle according to claim 1 wherein the wheel means comprises a plurality of wheels on one side of the vehicle and a plurality of wheels on the other side of the vehicle, each being independently driven or drivable to thereby permit the vehicle to be steered.

17. An off-road vehicle according to claim 1 further comprising a slideably mounted support within the cradle and adapted to be slid from a position within the cradle to a forward position remote therefrom.

18. An off-road vehicle according to the claim 17 wherein the slideable support includes a chair moveable thereon to a forward ground-engaging position.

* * * * *